United States Patent
Enthaler et al.

(10) Patent No.: US 9,103,655 B2
(45) Date of Patent: Aug. 11, 2015

(54) METHOD FOR POSITIONING A MOTOR VEHICLE, SYSTEM WITH SUCH A MOTOR VEHICLE, AND MOTOR VEHICLE

(71) Applicant: Audi AG, Ingolstadt (DE)

(72) Inventors: Achim Enthaler, Ingolstadt (DE); Björn Elias, Hepberg (DE)

(73) Assignee: AUDI AG, Ingolstadt (DE)

( * ) Notice: Subject to any disclaimer, the term of this patent is extended or adjusted under 35 U.S.C. 154(b) by 70 days.

(21) Appl. No.: 13/955,886

(22) Filed: Jul. 31, 2013

(65) Prior Publication Data

US 2014/0035565 A1 Feb. 6, 2014

(30) Foreign Application Priority Data

Aug. 1, 2012 (DE) .................... 10 2012 015 262

(51) Int. Cl.
*G01B 7/14* (2006.01)
*B60L 11/18* (2006.01)

(52) U.S. Cl.
CPC .............. *G01B 7/14* (2013.01); *B60L 11/1829* (2013.01); *B60L 11/1833* (2013.01); *Y02T 10/7005* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC ... G01B 7/14; B60L 11/1829; B60L 11/1833; Y02T 10/7005; Y02T 90/125; Y02T 90/12; Y02T 90/14; Y02T 90/122; Y02T 90/121
See application file for complete search history.

(56) References Cited

U.S. PATENT DOCUMENTS

| | | | |
|---|---|---|---|
| 5,323,098 A | 6/1994 | Hamaguchi et al. | |
| 5,654,621 A | 8/1997 | Seelig | |
| 5,821,731 A * | 10/1998 | Kuki et al. | 320/108 |
| 2007/0069684 A1 | 3/2007 | Ramsden | |
| 2010/0060486 A1 | 3/2010 | Nakashima et al. | |
| 2010/0161217 A1* | 6/2010 | Yamamoto | 701/207 |
| 2012/0043172 A1* | 2/2012 | Ichikawa | 191/45 R |
| 2012/0187757 A1 | 7/2012 | Wechlin et al. | |

(Continued)

FOREIGN PATENT DOCUMENTS

| | | |
|---|---|---|
| CN | 101764435 | 6/2010 |
| DE | 42 36 286 | 5/1994 |

(Continued)

OTHER PUBLICATIONS

Translation of Applicant cited JP 2011-182608.*

*Primary Examiner* — Huy Q Phan
*Assistant Examiner* — Adam Clarke
(74) *Attorney, Agent, or Firm* — Henry M. Feiereisen LLC (57) ABSTRACT

A method for positioning a motor vehicle in relation to a primary element of a charging device disposed on a side of a roadway of the motor vehicle for contactless charging of an electric storage device of the motor vehicle, includes moving a secondary element of the charging device arranged on the motor vehicle and interacting with the primary element relative to the primary element by moving the motor vehicle on the roadway into a predetermined charging position, and determining with at least one sensor and at least one positioning element having at least two mutually different markers, when the secondary element has reached the predetermined charging position, by detecting the markers with the sensor.

8 Claims, 5 Drawing Sheets

(56) References Cited

U.S. PATENT DOCUMENTS

2012/0203410 A1    8/2012  Wechlin et al.
2014/0074352 A1*   3/2014  Tate et al. .................. 701/36
2015/0061576 A1*   3/2015  Chen .......................... 320/108

FOREIGN PATENT DOCUMENTS

| | | |
|---|---|---|
| DE | 691 19 168 | 8/1996 |
| DE | 102009033236 | 1/2011 |
| DE | 102009049432 | 4/2011 |
| JP | 2001-277969 | 10/2001 |
| JP | 2009-184426 | 8/2009 |
| JP | 2011-182608 | 9/2011 |
| WO | WO 2011/006884 | 1/2011 |
| WO | WO 2011/135571 | 11/2011 |
| WO | WO 2012/047779 | 4/2012 |

* cited by examiner

METHOD FOR POSITIONING A MOTOR VEHICLE, SYSTEM WITH SUCH A MOTOR VEHICLE, AND MOTOR VEHICLE

CROSS-REFERENCES TO RELATED APPLICATIONS

This application claims the priority of German Patent Application, Serial No. 10 2012 015 262.0, filed Aug. 1, 2012, pursuant to 35 U.S.C. 119(a)-(d), the content of which is incorporated herein by reference in its entirety as if fully set forth herein.

BACKGROUND OF THE INVENTION

The present invention relates to a method for positioning a motor vehicle, a system with such a motor vehicle and a motor vehicle.

The following discussion of related art is provided to assist the reader in understanding the advantages of the invention, and is not to be construed as an admission that this related art is prior art to this invention.

Motor vehicles with an electrical storage device in the form of a battery and a charging device for contactless charging of a secondary element, for example in form of a coil, associated with the electrical storage device are known in the art. The secondary element interacts to a primary element, in particular, a primary coil of the charging device. The primary element is, for example, coupled to a power grid. To charge the electric storage device, energy is transmitted inductively from the primary element to the secondary element without physical contact.

To ensure efficient energy transfer between the primary element and the secondary element, and to consequently realize efficient charging of the electrical storage device, the secondary element must be moved into a predetermined charging position relative to the primary element.

In one conventional embodiment, the primary element is moved by a moving device relative to a roadway of the motor vehicle within a predetermined spatial region in all three spatial co-ordinates, while the motor vehicle is stationary on and does not move relative to the roadway. In another conventional embodiment, the motor vehicle can be positioned with at least one wheel, in particular with its two front wheels and its two rear wheels, in a depression arranged in the ground, thereby causing a secondary winding of the motor vehicle to be inductively coupled with the primary conductor.

Accurately attaining the predetermined charging position is advantageous for achieving a high efficiency in the energy transfer between the primary element and the secondary element. With the known methods, systems and motor vehicles, a precise positioning is possible with very high complexity.

It would therefore be desirable and advantageous to obviate prior art shortcomings and to provide an improved method, system and motor vehicle, which allow particularly precise and simple positioning of the secondary element with respect to the primary element.

SUMMARY OF THE INVENTION

According to one aspect of the present invention, a method for positioning a motor vehicle in relation to a primary element of a charging device disposed on a side of a roadway of the motor vehicle for contactless charging of an electric storage device of the motor vehicle, includes moving a secondary element of the charging device arranged on the motor vehicle and interacting with the primary element relative to the primary element by moving the motor vehicle on the roadway into a predetermined charging position, and determining with at least one sensor and at least one positioning element having at least two mutually different markers, when the secondary element has reached the predetermined charging position, by detecting the markers with the sensor.

According to an advantageous feature of the present invention, the secondary element can be easily and precisely moved into the charging position by determining with at least one sensor and with at least one positioning element having at least two different markers when the secondary element has reached the charging position by detecting the markers with the sensor.

The motor vehicle, and hence the secondary element can thus be readily positioned with great precision relative to the primary element without the need to activate the secondary element and the primary element. It can also be very robustly and reproducibly determined when the charging position has been reached because there is no need for the stationary primary element and the movable secondary element to communicate with each other. Furthermore, execution of the method is particularly cost-effective, since only a small number of sensors are needed, and the sensor as well as the positioning element is inexpensive.

According to another advantageous feature of the present invention, one of the markers may be raised relative to the other marker, wherein a distance sensor may be used as a sensor which measures mutually different distances between the distance sensor and the motor vehicle, respectively, from the respective marker for determining when the respective charging position has been reached. In other words, the distance sensor is able to detect the raised marker and marker recessed in relation thereto, so that a position of the secondary element relative to the primary element can be determined. As a result, it can be determined whether this position at least substantially coincides with the charging position, for example within predeterminable tolerances, or whether the position and the charging position differ, for example, with the difference exceeding a threshold value.

Advantageously, the positioning element is constructed to withstand harsh weather conditions, so it can still be precisely determined when the charging position has been reached even under adverse environmental conditions, such as rain, or after a long service life of the positioning element.

According to another advantageous feature of the present invention, the markers may be formed differently from each other in their respective color, wherein an optical sensor is used as the sensor, which is able to detect the respective, differently colored markers for determining when the charging position has been reached. This enables a particularly accurate determination of the charging position, and subsequently a particularly precise alignment of the secondary element relative to the primary element, thus benefiting the effective and efficient energy transfer between the primary element and the secondary element.

Due to the precise alignment of the secondary element relative to the primary element, the electric storage device, which is for example a battery of the motor vehicle, can be charged efficiently and with very low losses. This also enables very rapid charging. In other words, the electric storage device can be charged in a very short time.

According to another advantageous feature of the present invention, the secondary element can be very precisely aligned relative to the primary element by arranging the positioning element with an at least partial overlap with the primary element or secondary element.

It can be readily determined when the charging position is reached when the positioning element extends at least substantially flat in a plane and projects in the plane at least beyond an edge of the primary element and the secondary element.

According to the method of the invention, it is possible to assist the driver of the motor vehicle who drives the motor vehicles relative to the roadway in aligning the secondary element relative to the primary element, for example by displaying in the interior of the motor vehicle on a display screen when the charging position has been reached. Furthermore, the sensor and the positioning element may be used to detect a current position of the motor vehicle, in particular of the secondary element relative to the primary element, while the motor vehicle is moving, and to display this position on the display screen, which would allow the driver to particularly easily move the motor vehicle so as to bring the secondary element into the charging position. The method thus provides an effective and accurate support for the driver.

Alternatively, according to another advantageous feature of the present invention, the secondary element may also be automatically moved into the charging position. According to another advantageous feature of the present invention, the secondary element is here moved into the charging position by moving the motor vehicle with a controller of the motor vehicle until it has been determined by the sensor and the positioning element that the charging position has been reached. For example, the motor vehicle can be automatically moved in conjunction with an automated parking system of the motor vehicle, wherein the motor vehicle assumes a corresponding position relative to the primary element with no or only very little intervention by the driver, so that the secondary element is in the charging position. In particular, the motor vehicle is at least steered by the controller. Alternatively or additionally, the motor vehicle can be automatically accelerated and/or braked for moving the secondary element into the charging position with the controller. In this way, a particularly high level of driving and operating comfort of the motor vehicle can be attained.

According to another aspect of the invention, a system for contactless charging of an electric storage device of a motor vehicle includes a primary element of a charging device disposed on a side of a roadway, a secondary element of the charging device arranged on the motor vehicle and interacting with the primary element, wherein the secondary element is moved into a predetermined charging position relative to the primary element by moving the motor vehicle on a roadway, and at least one positioning element having at least two mutually different markers and at least one sensor capable of detecting the markers for determining when the predetermined charging position has been reached.

According to an advantageous feature of the present invention, the positioning element may be arranged on the side of the roadway, whereas the sensor may be disposed, for example, on the motor vehicle. Conversely, the sensor may be arranged on the side of the roadway surface and thus on the side of the primary element, whereas the marker is attached on the motor vehicle.

By detecting the markers with the sensor, a position of the motor vehicle and hence of the secondary element relative to the primary element can be detected and it can subsequently be determined, whether the position coincides with the charging position, for example, within predeterminable tolerances. When this is the case, the secondary element is moved into the charging position, thus enabling particularly efficient energy transfer between the primary element and the secondary element.

According to yet another aspect of the invention, a motor vehicle has at least one electrical storage device, at least one secondary element associated with a charging device for contactless charging the electrical storage device, wherein the at least one secondary element is movable relative to a primary element of the charging device arranged on a side of a roadway by moving the motor vehicle on the roadway into a predetermined charging position, and at least one sensor configured to detect at least two mutually different markers of a positioning element arranged on a side of the primary element for determining when the predetermined charging position has been reached.

A position of the motor vehicle, and thus of the secondary element, relative the primary element can thus be very precisely detected with the sensor, allowing the secondary member to be moved very precisely into the charging position.

In a particularly advantageous embodiment of the invention, the sensor is arranged next to the secondary element in the longitudinal direction and/or in the transverse direction of the motor vehicle. The energy transfer between the primary element and the secondary element is then not affected, while simultaneously realizing a particularly precise detection of a position of the secondary element relative to the primary element.

According to another advantageous feature of the present invention, the sensor may arranged in the vertical direction of the motor vehicle underneath a motor vehicle floor of the motor vehicle. The sensor is thus of obscured from view. It can then be readily and cost-effectively determined when the charging position has been reached.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

FIGS. 1a-d serve to describe the background of the invention.

Figure 1A:
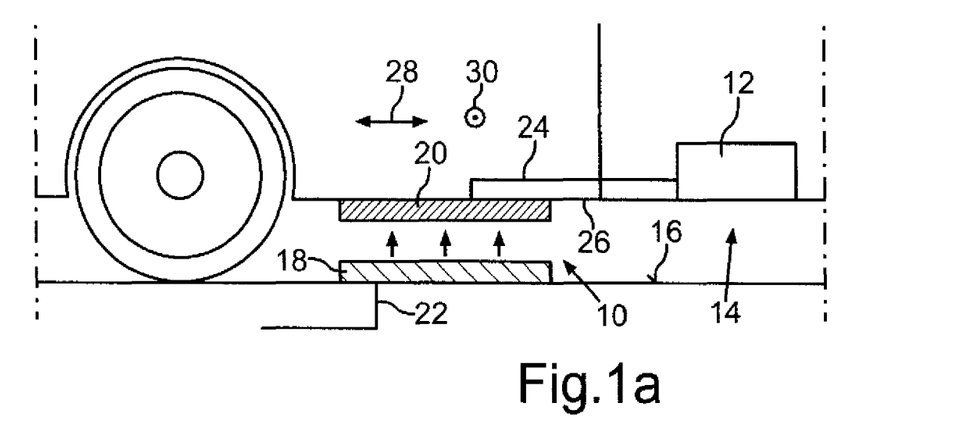
FIG. 1a is a schematic side view of a charging device for contactless charging of an electrical storage device of a motor vehicle, with a primary element disposed on the side of a roadway of the motor vehicle and with a secondary element disposed on the side of the motor vehicle, wherein the secondary element is in a charging position relative to the primary element.

Turning now to the drawing, and in particular to FIG. 1a, there is shown a schematic side view of a contactless charging device 10 (shown in a simplified diagram in FIG. 1a) for charging an electric storage device in the form of a battery 12 of a passenger car 14.

The passenger car 14 outlined in FIG. 1a is, for example, as a hybrid vehicle or an electric vehicle and has at least one electric motor for driving the passenger car 14. Electric current for operating the electric motor is supplied from the battery 12. The total charge of the battery 12 is reduced when supplying electric energy to the electric motor from the battery 12.

The charging device 10 is provided for particularly comfortably and easily recharging the battery 12. The charging device 10 has a primary element 18 arranged on the side of a roadway 16 of the passenger car 14 and a secondary element 20 arranged on the passenger car 14. In the present example, the primary element 18 and the secondary element 20 are at least substantially plate-shaped, and are also referred to as charging plates. The primary element 18 and the secondary element 20 each include a respective coil, between which power is transmitted without physical contact.

The primary element 18 is connected here via at least one electric line 22 to a power grid, and configured to transmit electric energy to the secondary element 20 contactless, i.e. without cables for charging the battery 12, as indicated in FIG. 1a by directional arrows. The secondary element 20 is connected via an electric line element 24 with the battery 12, so that the energy transmitted from the primary element 18 to the secondary element 20 can be supplied to the battery 12.

As can be seen from FIG. 1a, the secondary member 20 is disposed below a vehicle floor 26 of the passenger car 14. In the present example, the secondary element 20 is arranged on the vehicle floor 26 and may also be integrated in the vehicle floor 26.

Figure 1B:
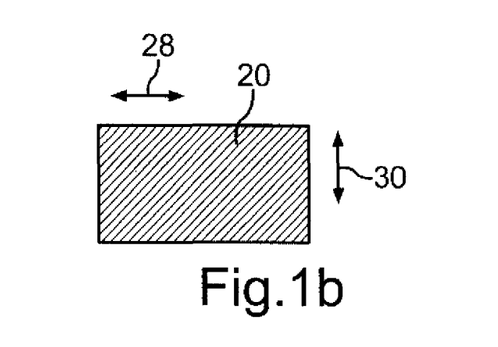
FIG. 1b is a schematic plan view of the charging device.

For efficient energy transmission, the mobile secondary element 20 arranged on the passenger car 14 is moved into a predeterminable charging position relative to the primary element 18, where the secondary element 20 covers the primary element 18 upwards in the motor vehicle's vertical direction, by moving the passenger car 14 on the roadway 16 relative to the roadway 16. This advantageous charging position is illustrated in FIGS. 1a and 1b. As seen from FIG. 1a, when the secondary element 20 reaches the charging position, there is no offset or only a very slight offset within specifiable tolerance in the vehicle's longitudinal direction, as indicated by directional arrow 28. FIG. 1b illustrates that, when the charging position has been reached, there is no offset or only a very slight offset within specifiable tolerance between the primary element 18 and the secondary element 20 in the vehicle's transverse direction, as indicated by a directional arrow.

It is difficult for the driver to move the secondary element 20 by moving the passenger car 14 on the roadway 16 relative to the roadway 16—unless specific counter-measures are taken—because the stationary primary element 18 underneath the passenger car 14 becomes invisible to the driver in a parking operation of the passenger car 14, where the charging position should be approached. Precise positioning of the passenger car 14 above the stationary primary element 18 is therefore very difficult or not possible.

Figure 1C:
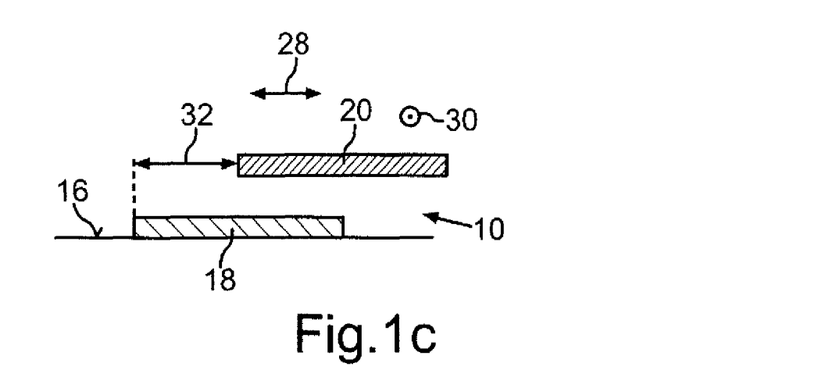
FIG. 1c is a further schematic side view of the charging device, wherein the secondary element is located outside the charging position.
Figure 1D:
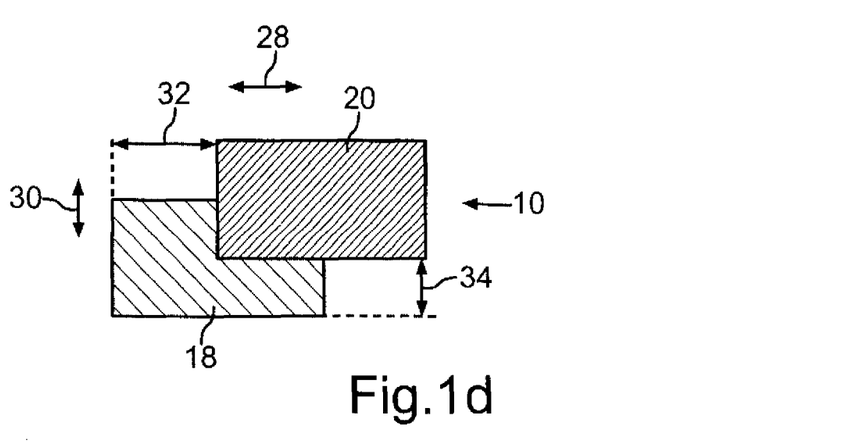
FIG. 1d is a further schematic plan view of the charging device, wherein the secondary element is located outside the charging position.

FIGS. 1c and 1d illustrate the position of the secondary element 20 outside the charging position, wherein the passenger car 14 is not shown in FIG. 1c to FIG. 7 so as not to obscure the drawing.

According to FIG. 1c, an offset in the vehicle's longitudinal direction exists, as indicated by a double arrow 32, so that an area effective for the energy transmission between the primary element 18 and the secondary element 20, in which is the secondary element 20 covers the primary element 18, becomes smaller in relation to the charging position. FIG. 1d indicates with an arrow 34 also an offset in the vehicle's transverse direction is, which makes the effective area between the primary element 18 and the secondary element 20 particularly small. This results in unwanted energy losses due to poor efficiency during charging. Furthermore, components of the passenger car 14 may also be heated due to the incorrect positioning. The poor efficiency results in longer charge times. Moreover, the driver may have to perform optionally perform multiple, potentially difficult maneuvers before the secondary element 20 is positioned relative to the primary element 18 with sufficient precision.

Figure 2:
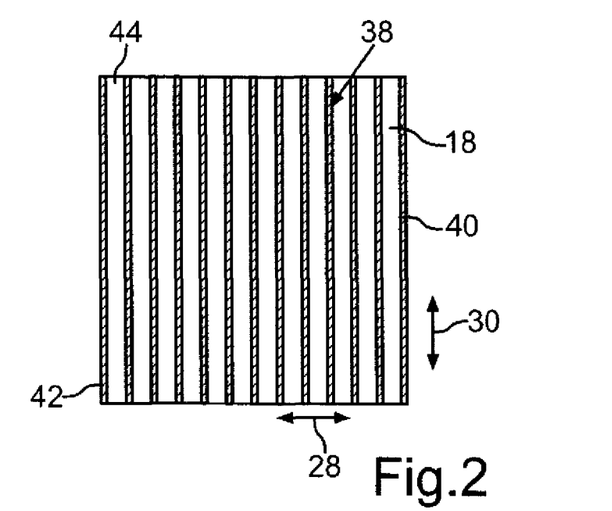
FIG. 2 is a schematic plan view of the primary element with an associated positioning element according to the present invention, configured to determine when the charging position has been reached.
Figure 3:
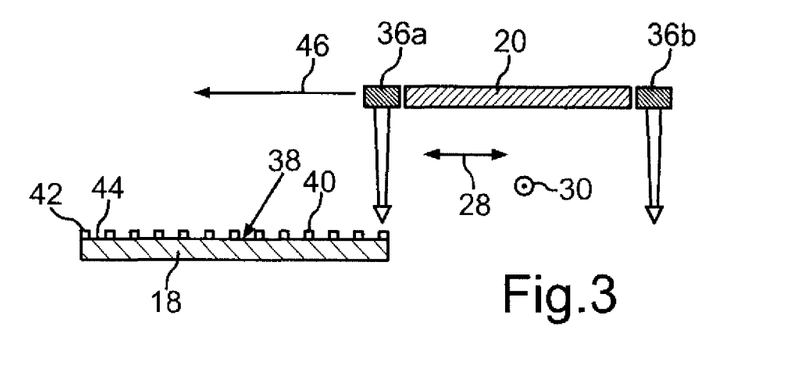
FIG. 3 is a schematic side view of the charging device with the primary element and the positioning element of FIG. 2 according to the present invention, wherein four sensors configured to determine when the charging position has been reached are provided on the side of the secondary element.
Figure 4:
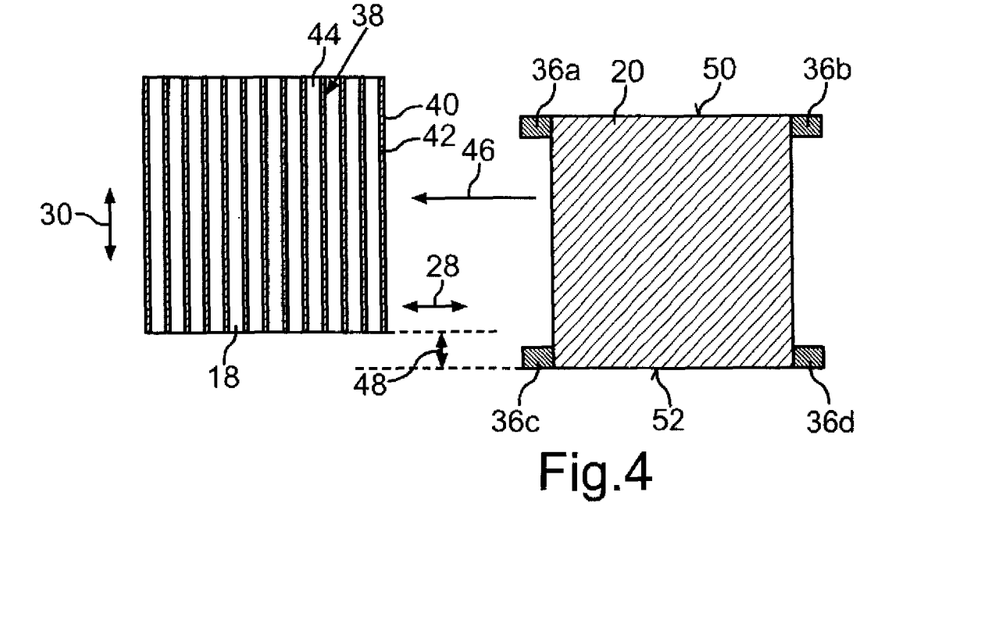
FIG. 4 is a schematic plan view of the primary element with the positioning element of FIG. 2 and the secondary element with the sensors of FIG. 3 according to the present invention.

To very precisely position the secondary element 20 in the charging position, a simple method illustrated in FIGS. 2 to 4 is performed for positioning the passenger car 14 with respect to the primary element 18, wherein it is determined with a positioning element 40 having markers 38 and with sensors 36a-d detecting the markers 38 when the secondary element 20 has reached the charging position by moving of the passenger car 14 on the roadway 16 relative to the roadway 16.

In the present example, the positioning element 40 with the markers 38 is associated with the stationary primary element 18 and is hence disposed on the side of the primary element 18. The positioning element 40 includes as markers 38 ridges 42 and depressions 44 which are each arranged between two of the ridges 42 and which are set back with respect to the ridges 42. The ridges 42 hereby represent heights of the positioning element 40, whereas the depressions 44 represent recesses or grooves. In the present example, thirteen ridges 42 and twelve depressions 44 are provided, which are alternatingly arranged. The ridges 42 are raised from the roadway 16 above the recesses 44. A vertical profile of the positioning element 40 is produced by the ridges 42 and grooves 44 recessed in relation thereto.

As illustrated in conjunction with FIGS. 3 and 4, the sensors 36a-d are associated with the secondary element 20 and are arranged on the passenger car 14 and presently on the outside of its vehicle floor 26 and directed towards the roadway 16. The sensors 36a-d are hereby formed as distance sensors capable of detecting mutually different distances between the sensors 36a-d and the passenger car 14, respectively, and the respective ridges 42 and depressions 44. In other words, when the sensor 36a is located for example above one of the ridges 42, the distance between this ridge 42 and the sensor 36a is smaller than when the sensor 36a is located above one of the depressions 44.

When the passenger 14 with the sensors 36a-d arranged on the vehicle floor 26 is now moved across the stationary primary element 18 in a parking operation in the direction of travel indicated by directional an arrow 46, the ridges 42 and the depressions 44 are detected with the described distance measurement. The number of ridges 42 and depressions 44 are counted, for example, with an unillustrated controller. Reaching the charging position by the secondary element 20 when passing over the positioning element 40 in the travel direction indicated by the arrow 46 then corresponds to passing a predefinable number of ridges 42 and depressions 44.

The controller then compares this predefinable number with an actual number of already passed ridges 42 and depressions 44 so that a current position of the secondary element 20 relative to the primary element 18 can be determined by comparing the actual number with by predeterminable number. When the predeterminable number coincides, for example within a predetermined tolerance, with the recognized actual number of traversed ridges 42 and depressions 44, the secondary element 20 has reached its advantageous charging position relative to the primary element 18, allowing efficient charging.

Reaching the charging position may be indicated to the driver by at least one acoustic and/or optical and/or haptic signal, so that the driver can stop the passenger car 14 in the charging position. Alternatively, the parking operation may be carried out automatically by the controller. In this situation, the passenger car 14 is automatically moved relative to the primary element 18, wherein this movement is automatically terminated when the controller has determined that the charging position has been reached by automatically stopping the passenger car 14. In this automatic parking operation, for example, a drive and a brake of the automobile 14 are actuated by the controller, allowing the parking operation to be performed automatically.

In addition, the driver may alternatively or additionally be continuously informed of the current position of the secondary element 20 relative the primary element 18 and in particular of a possible deviation of the actual position from the charging position, allowing the driver to reduce the possible deviation and approach the charging position particularly precisely.

As can be seen in FIGS. 3 and 4, the sensors 36a and 36c are arranged in the vehicle's longitudinal direction in front of the secondary element 20. In other words, the sensors 36a and 36c extend in front of the secondary element 20 in the vehicle's longitudinal direction. The sensors 36b and 36d extend in the rear of the secondary element 20 in the vehicle's longitudinal direction. With this arrangement, the charging position can advantageously be determined both in a forward travel direction indicated by directional arrow 46 and in an opposite reverse travel direction of the passenger car 14.

As seen with reference to FIG. 4, can not only be accurately positioned relative to the primary element 20 with the sensors 36a-d and with the positioning element 40 the secondary element 18 in the vehicle's longitudinal direction, but also in the vehicle's transverse direction. For example, when an approach of the primary element 18 in the forward direction causes a transverse offset, as indicated in FIG. 4 by a directional arrow 48, the depressions 44 and the ridges 42 are detected by the sensor 36a, but due to the lateral offset (transverse offset) not by the sensor 36c. In relation to the forward travel direction of the passenger car 14, this offset thus too far to the left relative to the primary element 18. Corresponding information signals can then be communicated to the driver to inform him of this lateral offset.

Within the context of the automatic parking operation, the position of the passenger car 14 can be automatically corrected by the controller by continuing to move the passenger car 14 to the right relative to the primary element 18. When the sensors 36a and 36c detect the same number of ridges 42 and depressions 44, it can be concluded that no lateral displacement exists.

Figure 5:
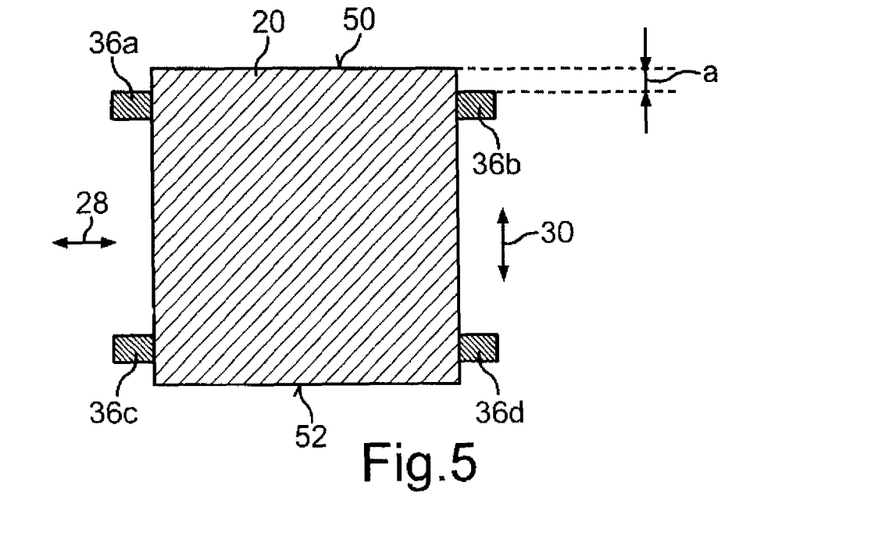
FIG. 5 is a schematic plan view of the secondary element with the sensors of FIG. 4 according to the present invention, wherein the position of the sensors relative to the secondary element is changed compared to FIG. 4.

According to FIG. 4, the sensors 36a-d are in the transverse direction flush with respective edges 50, 52 of the secondary element 20. According to FIG. 5, the sensors 36a-d are offset inwardly in the transverse direction compared to FIG. 4, creating a respective distance A between them and the edges 50, 52. This produces a tolerance for positioning the secondary element 20 relative to the primary element 18 in the vehicle's transverse direction, because for example the sensor 36a detects the ridges 42 and the depressions 44 even when the secondary element 20 protrudes slightly outwardly beyond the primary element 18 in the vehicle's transverse direction and is therefore slightly offset in the transverse direction relative to the primary element 18. However, such slight tolerances can be neglected for the efficiency of the energy transfer.

The mobile secondary element 20 can be easily and precisely aligned relative to the stationary primary element 18 with the sensors 36a-d and the positioning element 40. A predeterminable or predetermined number of ridges 42 and depressions 44, which could optionally be standardized, allows automatic and highly accurate positioning of the passenger car 14 and hence of the secondary element 20, in both the vehicle's longitudinal and transverse directions. The parking operation can also be performed at relatively high vehicle speeds, because the ridges 42 and depressions 44 can be detected and counted even at relatively high speeds without affecting the positioning accuracy.

In addition, the positioning operation can be performed automatically by the controller, resulting in a very high driving comfort. With the aforedescribed detection of the distance between the secondary element 20 and the primary element 18 in combination with a height-adjustable primary element 18 and/or with a height-adjustable secondary element 20 and/or in combination with an adjustable ground clearance of the passenger car 14, the vertical distance between the primary element 18 and the secondary element 20 can be adjusted to a predeterminable value, and thus be optimized for efficient energy transfer.

Figure 6:
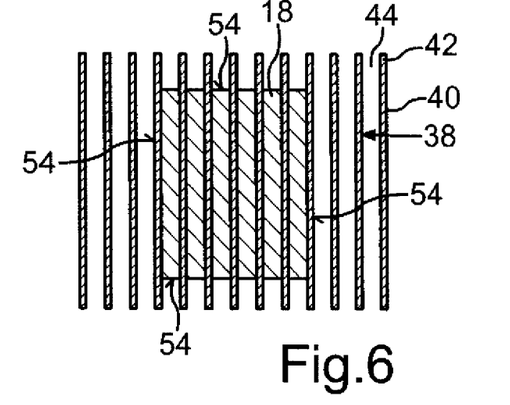
FIG. 6 is a schematic plan view of the primary element according to the present invention, with which a further embodiment of the positioning element is associated.
Figure 7:
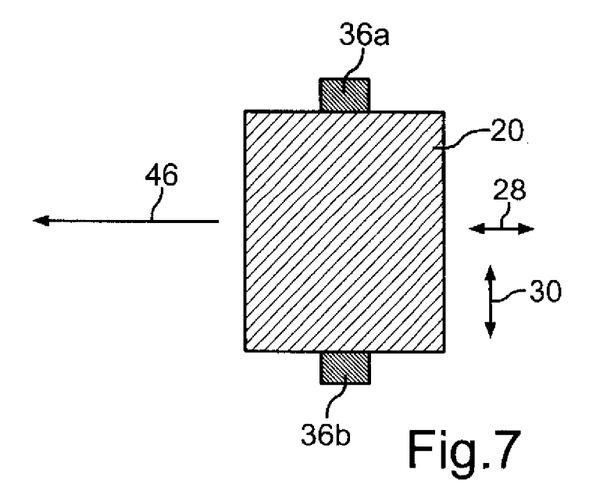
FIG. 7 is a schematic plan view of the secondary element according to the present invention, with which two sensors are associated which are configured to detect in cooperation with the positioning element of FIG. 6 when secondary element has reached the charging position.

FIGS. 6 and 7 illustrate another possibility for easily and very precise positioning the secondary element 20 relative to the primary element 18. The positioning element 40 has an at least substantially planar extent which in the present example is larger in two mutually perpendicular directions than a corresponding two-dimensional extent of the primary element 18. In other words, the primary element 18 is covered by the positioning element 40, wherein the positioning element 40 protrudes beyond respective edges 54 of primary element 18.

As is apparent from FIG. 7, only two sensors 36a, 36b are associated with the secondary element 20 which extend from the secondary element 20 in the vehicle's transverse direction. As also evident from FIGS. 2-5, the sensors 36a and 36b and 36a-d, respectively, are arranged in the vehicle's vertical direction without overlapping the secondary element 20 so as not to impede the energy transfer from the primary element 18 to the secondary element 20.

Due to the corresponding configuration of the positioning element 40 and the corresponding arrangement of the sensors 36a and 36b, the sensors 36a and 36b are able to detect and count the ridges 42 and the depressions 44 when passing over the positioning element 40. As soon as the sensors 36a and 36b have detected a predetermined number before reaching a center of the primary element 18, the secondary element 20 is in its charging position. The secondary element 20 can be aligned relative to the primary element 18 in the transverse direction in the aforedescribed manner.

In a system which includes the passenger car 14 with the secondary element 20 and the primary element 18, the positioning element 40 may alternatively be associated with the secondary element 20 and arranged accordingly on the passenger car 14, whereas the sensors 36a-d and 36a and 36b, respectively, are associated with the primary element 18 and are accordingly arranged on the side of the roadway surface 16. The driver of the passenger car 14 may be informed when the charging position has been reached and/or of the current position of the secondary element 20 relative to the primary element 18, for example, by an acoustic and/or visual signal, which is displayed outside the passenger car 14 by a corresponding display element of the system. Alternatively, the sensors 36a-d now disposed on the side of the roadway may be coupled to the passenger car 14 via a corresponding interface, so that when the charging position has been reached and/or the current position of the secondary element 20 relative to the primary element 18 may be communicated to the driver acoustically and/or haptically and/or optically in the interior of the passenger car 14. In other words, information about reaching the charging position and/or about the current position of the secondary element 20 relative to the primary element 18 can also be provided inside the passenger car 14.

Instead of the height profile represented by the ridges 42 and the depressions 44, the positioning element 40 may also have, for example, a corresponding pattern, wherein first markers 38 have a first color and second markers 38 have a second color that is different from the first color. For example, the first color may be black and the second color may be white. The second markers are hereby each arranged between two first markers. The sensors 36a-d may be implemented as optical sensors, for example cameras, capable of optically capture and count the differently colored markers 38 and thus determine the current position of the secondary element 20 relative to the primary element 18 in the aforedescribed manner.

For example, ultrasonic sensors with a small aperture angle, for example, in a range from including 5° to including 8° may be used as the distance sensors. The ridges 42 and/or the depressions 44 have preferably a width of about 2.5 cm, with a vertical distance between the secondary element 20 and the primary element 18 of for example 15 cm.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for positioning a motor vehicle in relation to a primary element of a charging device disposed on a side of a roadway of the motor vehicle for contactless charging of an electric storage device of the motor vehicle, comprising:
    moving a secondary element of the charging device arranged on the motor vehicle and interacting with the primary element relative to the primary element by moving the motor vehicle on the roadway relative to the roadway into a predetermined charging position,
    detecting with at least one sensor embodied as a distance sensor at least one positioning element constructed as a plurality of ridges and depressions arranged between the ridges,
    counting a number of ridges and depressions when the motor vehicle moves relative to the roadway and the secondary element passes over the positioning element,
    comparing the count of the number of passed ridges and depressions with a predefined number, and
    determining that the charging position has been reached when the number of passed ridges and depressions substantially coincides with the predefined number.

2. The method of claim 1, wherein the at least one positioning element at least partially overlaps with the primary element or with the secondary element.

3. The method of claim 1, wherein the at least one positioning element extends substantially flat in a plane and protrudes in the plane at least over an edge of at least one of the primary element and the secondary element.

4. The method of claim 1, wherein the motor vehicle is moved with a controller of the motor vehicle, until the charging position has been reached.

5. A system for contactless charging of an electric storage device of a motor vehicle, comprising
    a primary element of a charging device disposed on a side of a roadway,
    a secondary element of the charging device arranged on the motor vehicle and interacting with the primary element, wherein the secondary element is moved into a predetermined charging position relative to the primary element by moving the motor vehicle on a roadway, and
    at least one positioning element constructed as a plurality of ridges and depressions arranged between the ridges and at least one sensor constructed as a distance sensor capable of detecting the ridges and depressions,
    a controller of the motor vehicle configured to
    count a number of ridges and depressions when the motor vehicle moves relative to the roadway and the secondary element passes over the positioning element,
    compare the count of the number of passed ridges and depressions with a predefined number, and
    determine that the charging position has been reached when the number of passed ridges and depressions substantially coincides with the predefined number.

6. A motor vehicle, comprising
    at least one electrical storage device,
    at least one secondary element associated with a charging device for contactless charging the electrical storage device, wherein the at least one secondary element is movable relative to a primary element of the charging device arranged on a side of a roadway by moving the motor vehicle on the roadway into a predetermined charging position, and at least one sensor constructed as a distance sensor to detect a plurality of ridges and depressions arranged between the ridges of a positioning element arranged on a side of the primary element, a controller of the motor vehicle configured to count a number of ridges and depressions when the motor vehicle moves relative to the roadway and the secondary element passes over the positioning element, compare the count of the number of passed ridges and depressions with a predefined number, and determine that the charging position has been reached when the number of passed ridges and depressions substantially coincides with the predefined number.

7. The motor vehicle of claim 6, wherein the distance sensor is joined to the secondary element in at least one of the longitudinal direction and the transverse direction of the motor vehicle.

8. The motor vehicle of claim 6, wherein the distance sensor is arranged underneath a vehicle floor of the motor vehicle, as viewed in the motor vehicle's vertical direction.

* * * * *